Nov. 4, 1969 A. FERRARI ET AL 3,476,886

FOLDABLE TELEPHONE SET

Filed Oct. 31, 1966 10 Sheets-Sheet 1

INVENTORS
A. Ferrari
L. Callegari
G. Rivetta

BY Karl G. Ross
Attorney

A. Ferrari
L. Callegari
G. Rivetta
INVENTORS

BY
Karl F. Ross
Attorney

A. Ferrari
L. Callegari
G. Rivetta
INVENTORS

BY
Karl F. Ross
Attorney

A. Ferrari
L. Callegari
G. Rivetta
INVENTORS

BY Karl G. Ross
Attorney

A. Ferrari
L. Callegari
G. Rivetta
INVENTORS

BY

Karl F. Ross
Attorney

A. Ferrari
L. Callegari
G. Rivetta
INVENTORS

BY

Karl F. Ross
Attorney

A. Ferrari
L. Callegari
G. Rivetta
INVENTORS

BY

Karl F. Ross
Attorney

A. Ferrari
L. Callegari
G. Rivetta
INVENTORS

BY Karl F. Ross
Attorney

Nov. 4, 1969 A. FERRARI ET AL 3,476,886

FOLDABLE TELEPHONE SET

Filed Oct. 31, 1966 10 Sheets-Sheet 9

A. Ferrari
L. Callegari
G. Rivetta
INVENTORS

BY Karl G. Ross
Attorney

Nov. 4, 1969 A. FERRARI ET AL 3,476,886

FOLDABLE TELEPHONE SET

Filed Oct. 31, 1966 10 Sheets-Sheet 10

A. Ferrari
L. Callegari
G. Rivetta
INVENTORS

BY Karl G. Ross
Attorney

United States Patent Office 3,476,886
Patented Nov. 4, 1969

3,476,886
FOLDABLE TELEPHONE SET

Agostino Ferrari, Luciano Callegari, and Gianfranco Rivetta, Milan, Italy, assignors to Società Italiana Telecomunicazioni Siemens, S.p.A., Milan, Italy, a corporation of Italy Filed Oct. 31, 1966, Ser. No. 590,865
Claims priority, application Italy, Jan. 29, 1966, 1,997/66
Int. Cl. H04m *1/02*
U.S. Cl. 179—103 12 Claims

ABSTRACT OF THE DISCLOSURE

A foldable telephone in which the hand set contains a dial. The telephone set has two parts connected by a hinge, each part having an electrical-acoustical transducer at its end forming the transmitter and receiver of the handset. One part is longer than the other and, between its transducer and the hinge, is formed with the telephone dial.

Our present invention relates to a telephone handset of the type wherein a housing is divided into two hingedly interconnected portions which, when swung open, expose an earpiece, a mouthpiece and a dial while concurrently connecting the electrical circuit thereof to an outside line. An apparatus of this general description has been disclosed in commonly assigned application Ser. No. 275,-692, filed Apr. 26, 1963 now Patent No. 3,177,736, as well as in British Patent No. 1,032,279 and Italian Patent No. 668,192.

The principal object of our present invention is to provide a telephone handset of this character which is easy to manipulate, of compact construction and dependable in operation.

A more particular object of our invention is to provide a device of the character described which, when closed, is of pleasing appearance and offers only a minimum of pockets and recesses which might act as dust collectors.

These objects are realized, pursuant to an important feature of our invention, by the provision of a depression in the base of one of the two relatively swingable housing portions, this depression being located close to the hinge and serving to accommodate the dial whereas a more elevated part of the same base, remote from the hinge, contains the earpiece. The base of the second housing portion, provided on its front face with the mouthpiece, overlies in the closed position the depression of the first base, thus concealing both the dial and the mouthpiece while leaving the earpiece exposed. With the instrument resting on a table or other supporting surface by the underside of the cover of the second housing portion, which removable overlies the rear face of its base, virtually all that is visible of the instrument in this position will be the larger cover of its first housing portion.

An important advantage of this arrangement is the fact that, apart from space-saving considerations, the earpiece always remains free (as in the conventional telephone receiver) and out of contact with other parts of the apparatus, particularly with the associated mouthpiece which may be contaminated by the breath of a previous speaker.

The above and other features of our invention will be described in detail with reference to the accompanying drawing in which.

Figure 5:
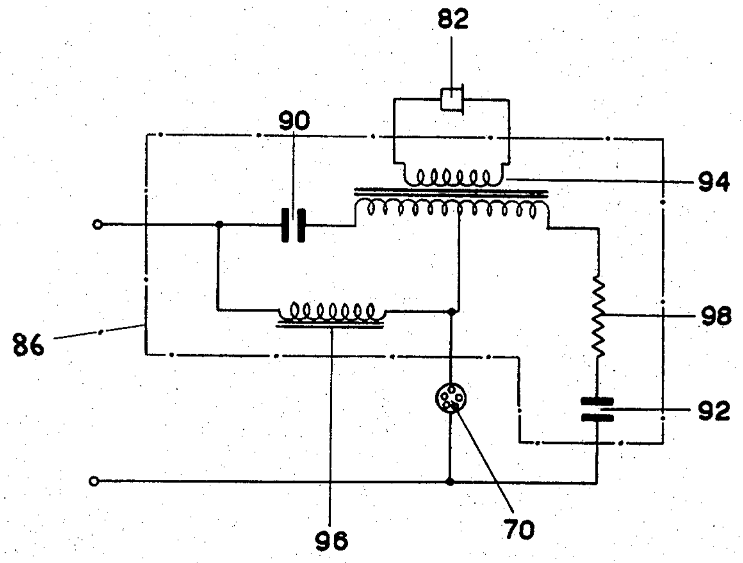
Figure 2:
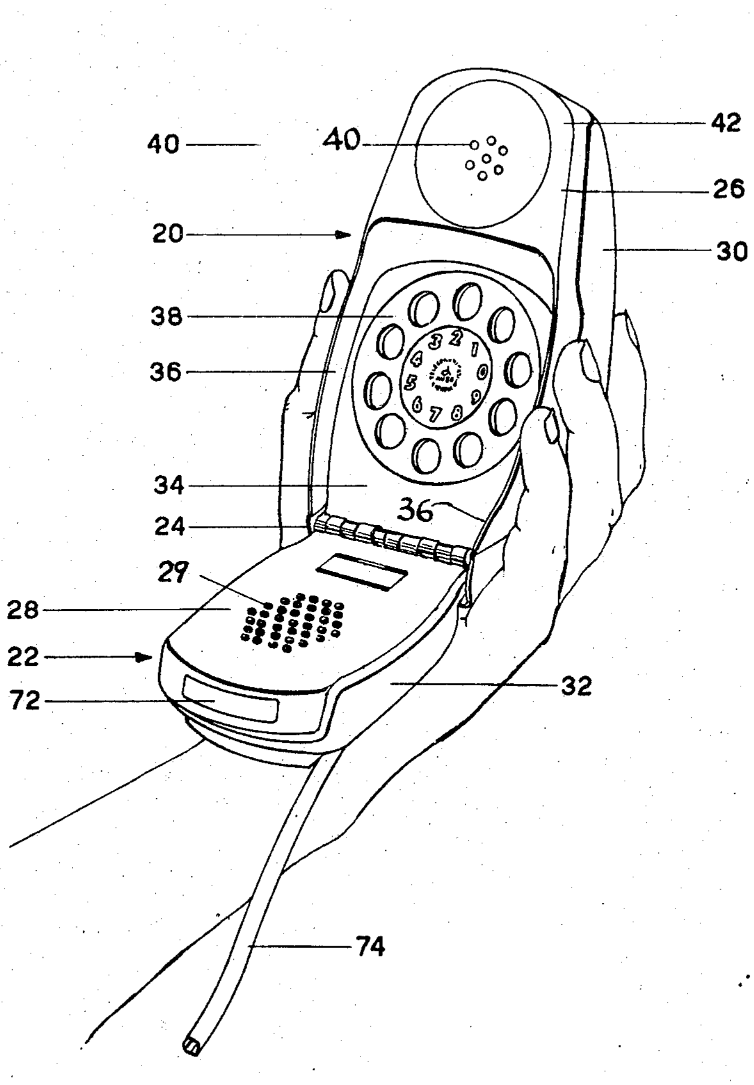
FIG. 2 is a perspective view of the open instrument.
Figure 3B:
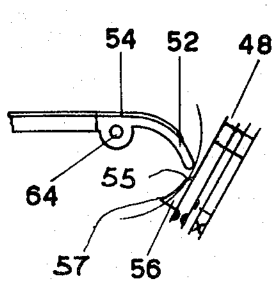
Figure 3A:
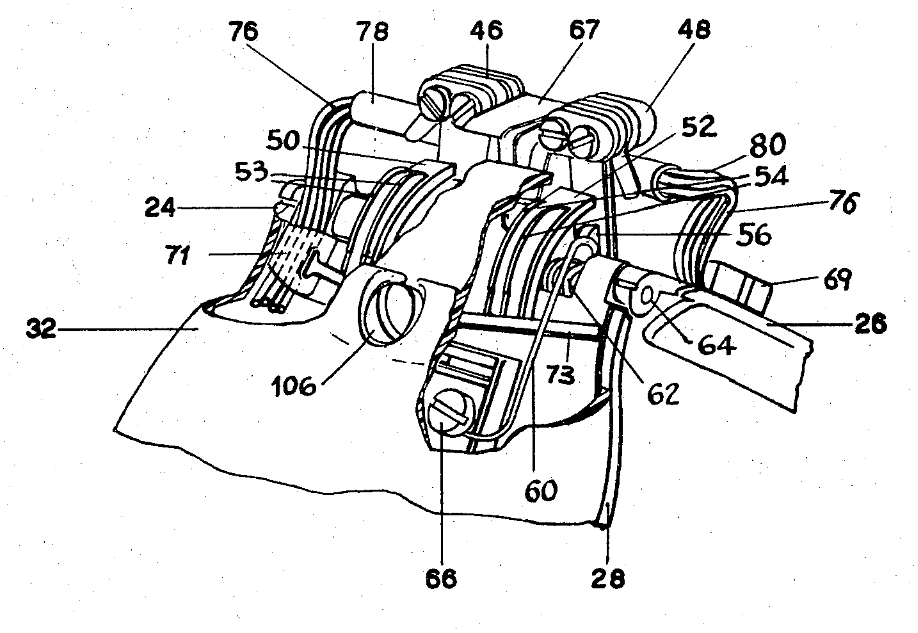
Figure 4:
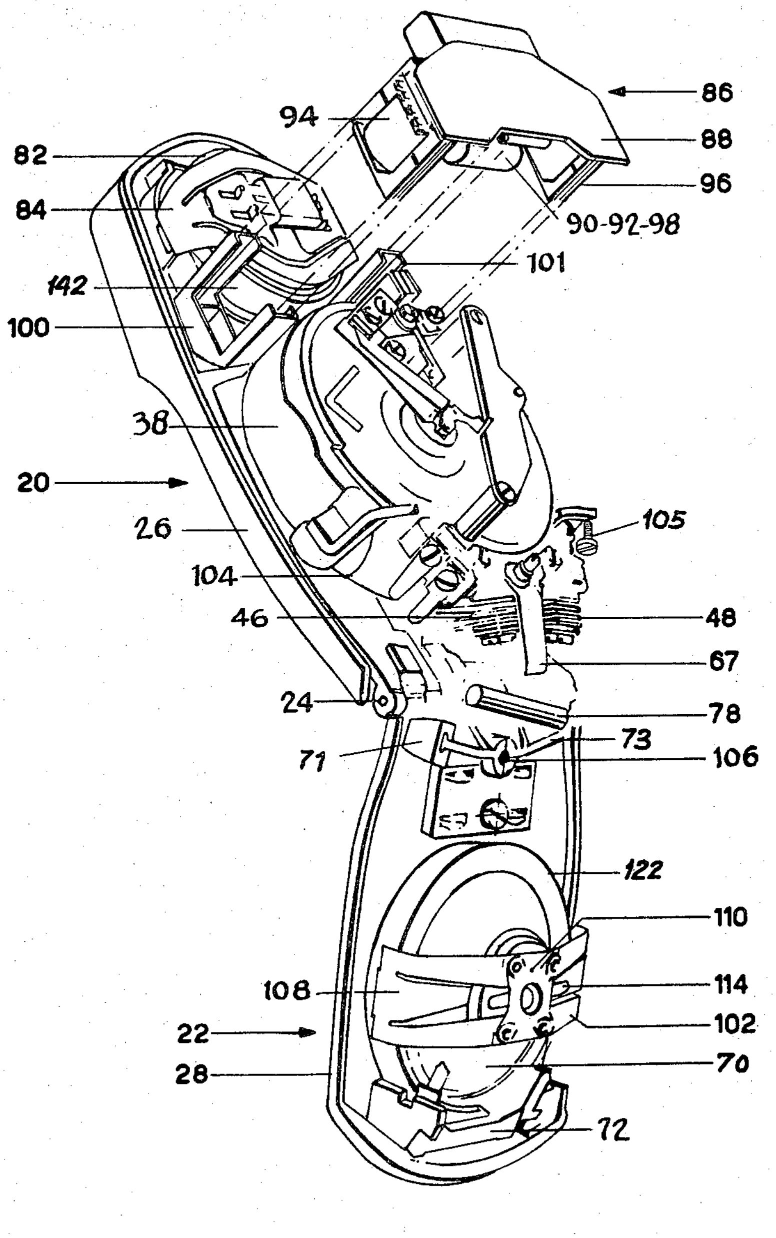
Figure 6:
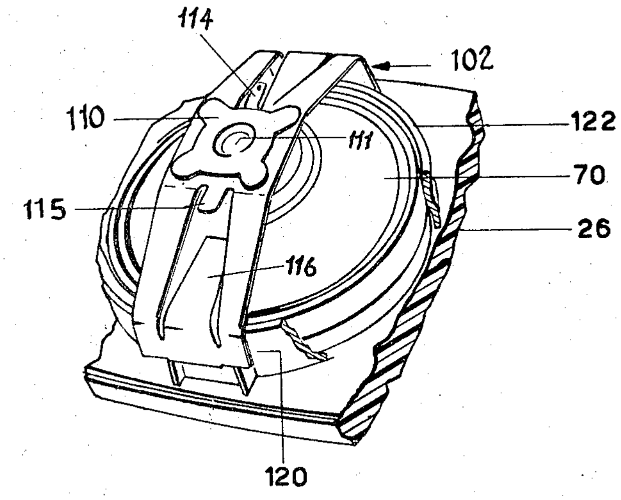
Figure 9:
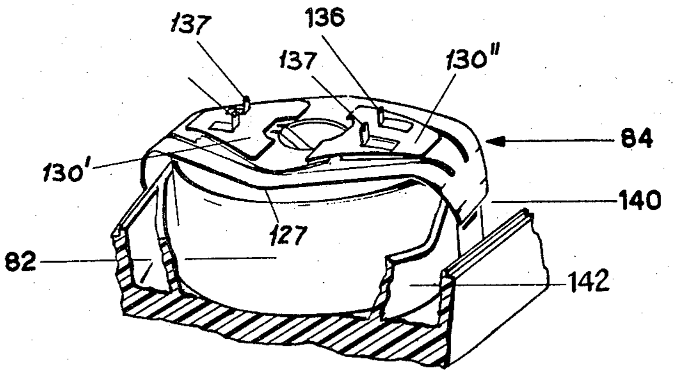
Figure 7:
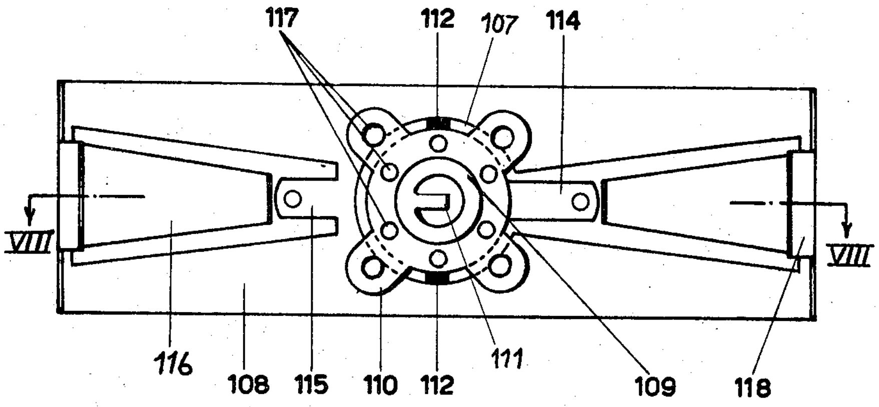
Figure 8:
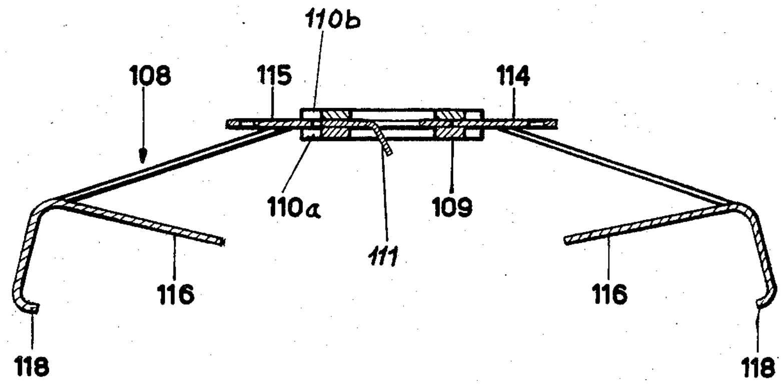
Figures 10, 11:
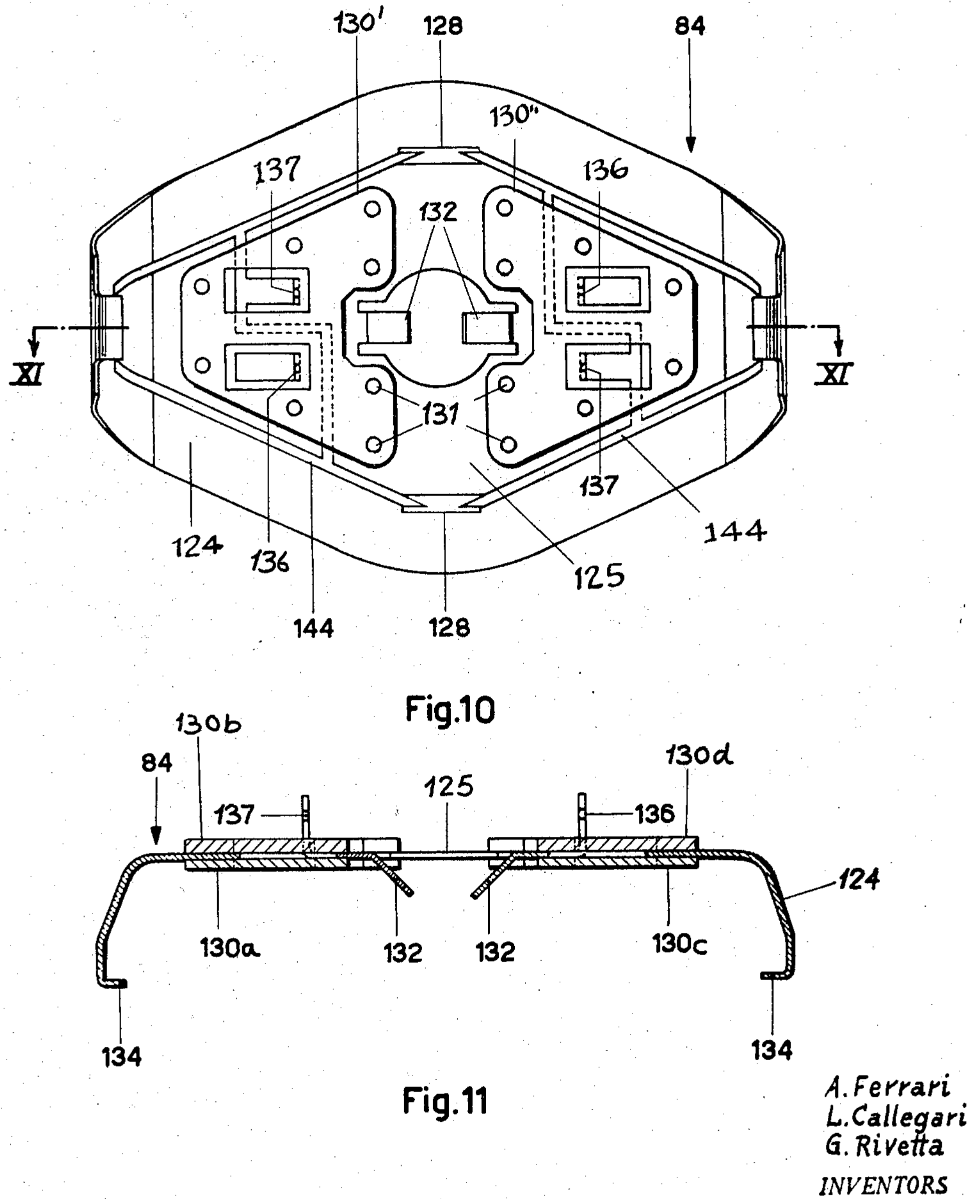
Figure 12:
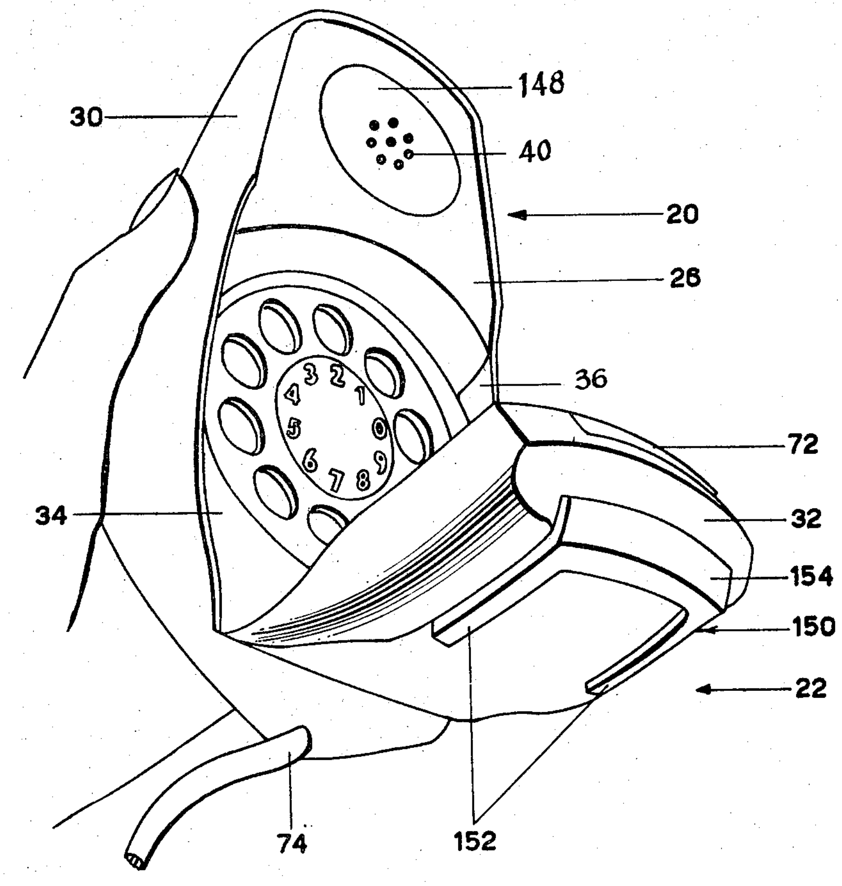
Figure 13:
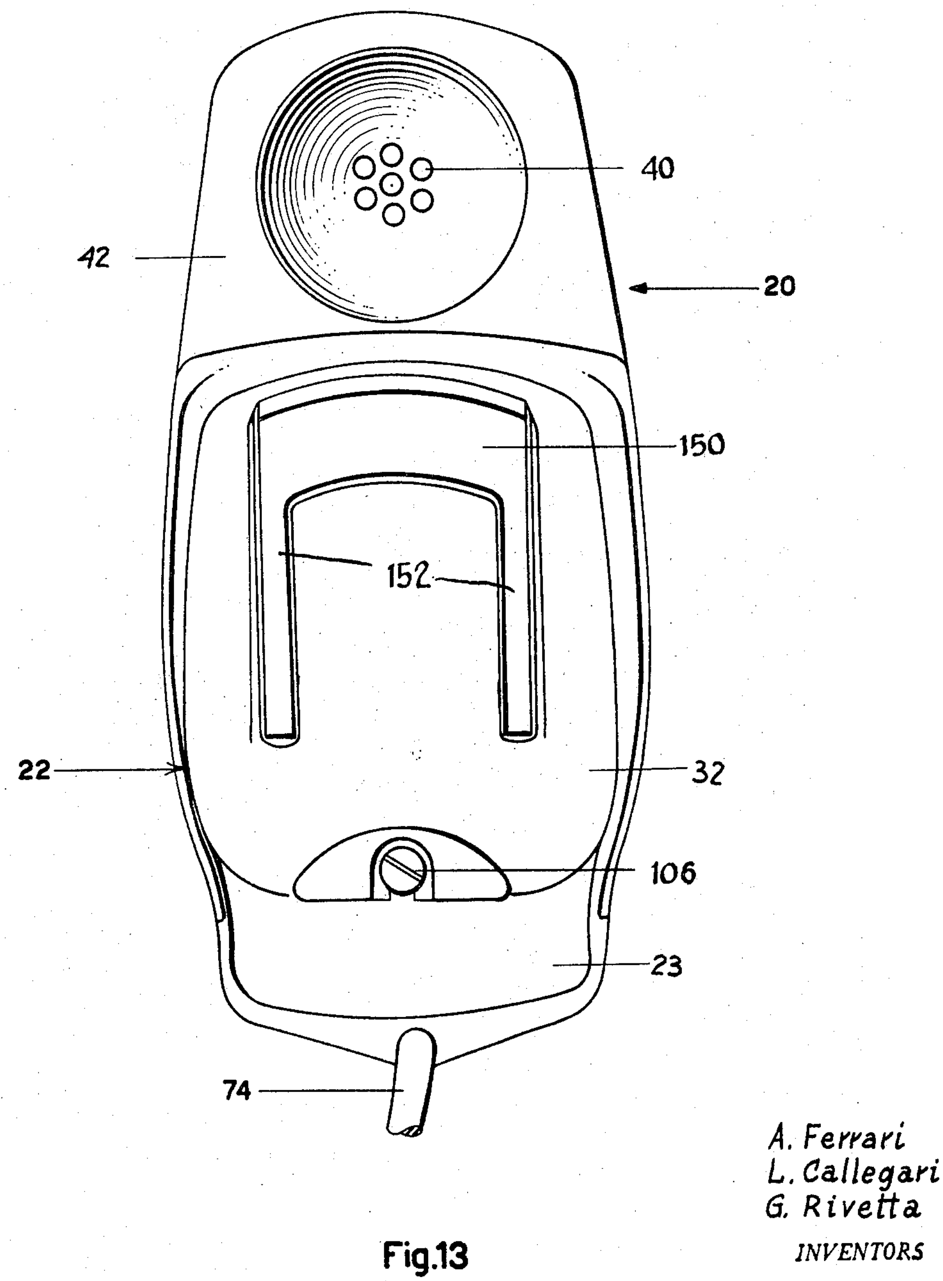

FIG. 3*a* is a perspective rear view of the hinge portion and associated elements of the instrument in the open position of FIG. 2;

FIG. 3*b* is a side-elevational detail view of part of the assembly seen in FIG. 3*a*;

FIG. 4 is a perspective rear view, partly exploded, of the open instrument with covers removed;

FIG. 5 is a circuit diagram illustrating the electrical connections between the elements of the instrument;

FIG. 6 is a perspective view of one of two electro-acoustic transducer assemblies in the instrument, i.e. a microphone disposed behind the mouthpiece in the smaller housing portion;

FIG. 7 is a bottom view of the component shown in FIG. 6;

FIG. 8 is a cross-sectional view taken on the line VIII—VIII of FIG. 7;

FIG. 9 is a perspective view similar to FIG. 6, illustrating the second electroacoustic transducer assembly, i.e. a receiver disposed behind the earpiece in the larger housing portion;

FIG. 10 is a bottom view of the componennt shown in FIG. 9;

FIG. 11 is a cross-sectional view taken on the line XI—XI of FIG. 10;

FIG. 12 is a view similar to FIG. 2, showing the instrument at a different angle to expose the underside of its smaller housing portion;

FIG. 13 is a bottom view of the closed instrument; and

Figure 14:
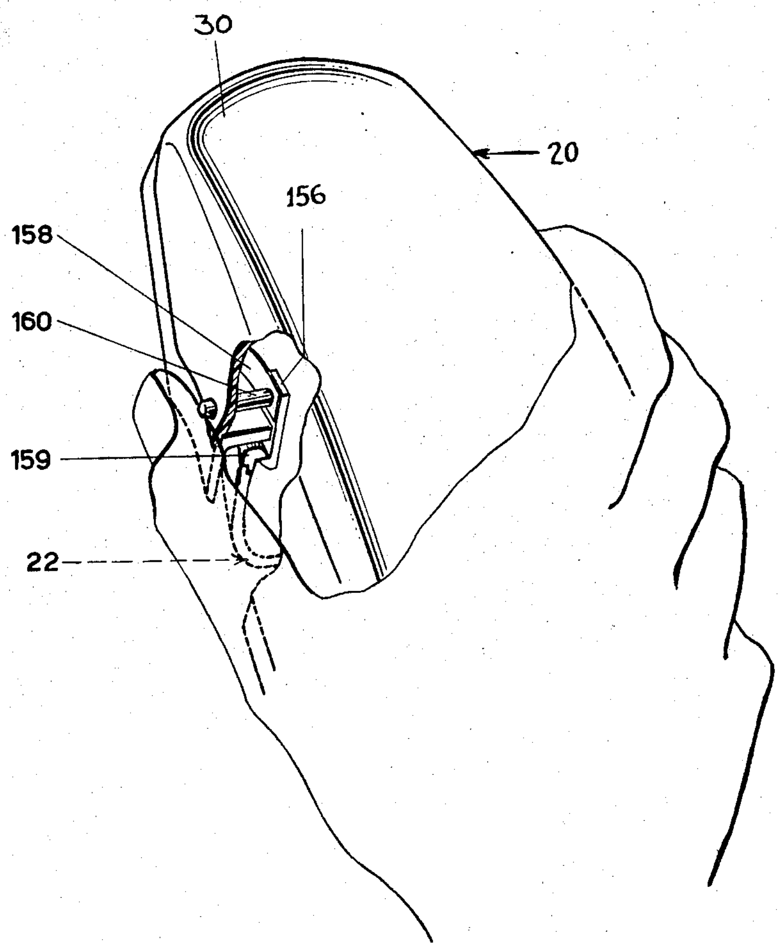

FIG. 14 is a perspective view of the instrument in its closed position.

Figure 1:
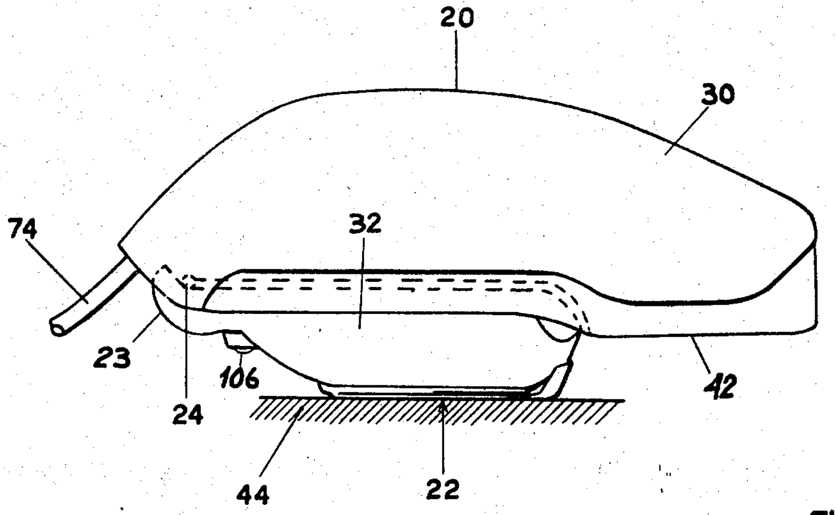
FIG. 1 is a side-elevational view of an instrument representing a preferred embodiment of our invention, shown in a closed position.

Reference will first be made to FIGS. 1 and 2 for a description of the overall construction of our improved telephone handset. The instrument comprises a housing divided into two portions 20 and 22 interconnected by a hinge 24, the larger portion 20 having a first base plate 26 overlain at its rear face by a removable cover 30; a similar cover 32 removably overlies the rear face of a second base plate 28 which is a part of the smaller housing portion 22. Base plate 26 is formed with a generally rectangular depression 34 bounded on three sides by edges 36 which are high enough to extend beyond the level of a telephone dial 38 accommodated within that depression. The dial 38, whose cylindrical casing penetrates the plate 26, may have a construction as described in commonly assigned U.S. application Ser. No. 433,664, filed Feb. 18, 1962, as well as in French Patent No. 1,415,366 and Italian Patent No. 705,280. At a location remote from hinge 24, which forms the fourth boundary of the depression 34, the base plate 26 rises slightly beyond the raised edges 36 and forms a plateau 42 whose apertured central part defines an earpiece 40. As best seen in FIGS. 1 and 13, the plateau 42 with the earpiece 40 extends beyond the housing portion 22, dimensioned to overlie the depression 34 and the dial 28, when the instrument is in its closed position. When the instrument is open (FIGS. 2 and 12), the user's face will touch only the earpiece 40 but his mouth and chin will be spaced from both the dial 38 and the base plate 28 whose perforated central portion 29 constitutes a mouthpiece. Moreover, the user during conversation is prevented by the edges 36 from accidentally moving the dial with his fingers.

Other external appurtenances of the instrument, illustrated in FIGS. 1, 2 and 12–14, include a cable 74 entering the device in the vicinity of hinge 24; a pushbutton 72 at the outer edge of base plate 28 which, possibly together with other manual switches not shown, may serve for intra-office signaling or similar purposes; a U-shaped rubber pad 150 with legs 152 and a bight portion 154, attached to the underside of cover 32 as a resilient and slip-resistant rest to enable the instrument to be deposited on a supporting surface 44, bight portion 154 first, with minimum impact; and a latch assembly (FIG. 14) including a catch 156 on a leaf spring 158 within cover 30, the hooked end of catch 156 being engageable with a detent 159 on housing portion 22 and being releasable therefrom by thumb pressure upon a pin 160 projecting outwardly through cover 30 from spring 158.

As indicated in FIGS. 1 and 13, the smaller cover 32 has a rearward extension 23 which bends around the hinge 24 and normally conceals the means 104, 105, described in greater detail hereinafter, whereby the larger cover 30 is removably secured to its base 26. Cover 32 is held in place by a single screw 106 which engages in a threaded bore of a boss 107 (FIG. 4) rising from the rear face of base 29. Thus, the apparatus in its closed position has the form of a cam shell, with only the screw 106 visible on its underside, to the exclusion of all other fasteners.

In FIG. 3*a* we have shown a set of contacts, corresponding to the hook switches of conventional telephone sets, which are open in the closed position of the instrument (FIG. 1) and are closed when the instrument is swung open about the axis of its hinge 24 defined by a pin 64. These contacts are divided into a pair of symmetrically disposed spring nests 46, 48 rising from the rear face of base 26 and co-operating with respective actuating arms 50, 52, rigid with base 28 and traversed by pin 64, whose free ends are engageable with the nearest armature of the respective spring nest when the bases 26, 28 are swung apart. As particularly illustrated for the switch assembly 48, 52 in FIG. 3*b*, the armature of spring nest 46 or 48 proximal to the free end of the associated actuating arm 50 or 52 carries a wedge 56 bounded by a camming surface 55 and a cylindrical surface 57 whose radius of curvature equals the distance from the tip of the actuating arm to the axis of pin 64, so that, once this tip has passed the camming edge 55, the position of the contact springs in their closed state will be unaffected by the extent of relative swing of the two bases. This insures that an established connection will not be broken even if the instrument rests on a vibrating support or if the user inadvertently presses down slightly on the upwardly tilted housing part 20, Arms 50 and 52 are reinforced by respective stiffening ribs 53 and 54.

The conductors of multistrand cable 74, connected to certain of the contact springs 46 and 48, form part of a circuit which includes a bundle of wires 76 extending between the relatively swingable housing portions 20 and 22. In order to minimize the mechanical strain of these wires and to prevent their fatiguing upon repeated opening and closing of the instrument, we prefer to carry these wires across the hinge 24 by passing an intermediate section 80 thereof in a transverse direction, parallel to hinge pin 64, through a protective insulating tube 78 extending over substantially the full width of the housing along the hinge 24. Conductor section 80 undergoes only slight torsion upon a relative swing of bases 26 and 28 while the remaining sections of conductors 76, passing along opposite edges of these two bases, experience hardly any deformation. Tube 78 is held down by a resilient clip 67 between spring nests 46, 48 as well as by further clips 69, 71, the latter being rigid with a yoke 73 supporting the boss 107 (FIG. 4) engaged by mounting screw 106.

A relatively weak coil spring 60 tends to maintain the housing parts 20 and 22 in their open position without unduly impeding their closure by manual pressure. This spring 60 has a helical part 62 surrounding the hinge pin 64 and is anchored at one extremity to base 28 by a screw 66; the other extremity of the spring is similarly anchored to base 26, as by being threaded into an eye of a lug (not shown) rising from the latter base.

In FIG. 4 there are visible the various circuit elements of the instrument that are normally concealed by the covers 30 and 32. These elements include a microphone capsule 70 disposed behind mouthpiece 29; another encapsulated electroacoustic transducer 82 behind earpiece 40; and associated circuitry forming part of a subassembly 86 whose components have been shown diametrically in FIG. 5. As illustrated in the latter figure, these components are a pair of condensers 90 and 92, a transformer 94, a choke 96 and a resistor 98; the circuit of FIG. 5 forms the subject matter of commonly assigned US application Ser. No. 414,348, filed Nov. 27, 1964, as well as French Patent No. 1,417,420 and Italian Patent No. 709, 222. Elements 90, 92 and 98 form part of a printed circuit on a carrier plate 88 which is rigid with transformer 94 and choke 96 to define therewith a yoke-shaped structure. The magnetic cores of elements 94 and 96, constituting the two arms of the yoke, are frictionally received in a pair of upstanding U-shaped brackets 100, 101 rising from base plate 26, these brackets being formed with a C-profile complementary to that of the magnetic cores.

A pair of L-shaped brackets 104 project rigidly from the rear surface of base plate 26 and are formed with perforated bores to receive mounting screws 105 (only one shown) by which the cover 30 is held onto the base 26. These mounting screws can be reached from the outside only upon removal of cover 32 after the detachment of its mounting screw 106 from boss 107.

The two encapsulated transducers 70 and 82 are removably secured to the rear faces of bases 28 and 26, respectively, by associated clips 102 and 84 described in greater detail with reference to succeeding figures. Thus, microphone capsule 70 is surrounded by a circular ridge 122 which is integral with base 28 and, as best seen in FIG. 6, is formed with a pair of diametrically opposite peripheral slots 120 receiving elastically inbent extremities 118 (FIGS. 7 and 8) of the supporting clip 102. The latter comprises a metallic stirrup 108, whose hook-shaped ends constitute the ridge-engaging extremities 118, and a metallic centerpiece 109 spacedly disposed in a central bore of stirrup 108. The annular gap 107 (FIG. 7) separating the stirrup 108 from the ring-shaped centerpiece 109 is bridged by an insulating connector 110 constituted by two coextensive plastic rings 110*a*, and 110*b* with four radially projecting arms sandwiching the pieces 108, 109 between them; the rings 110*a*, 110*b* are held together by metallic rivets 117 passing at peripherally spaced locations through the insulators 110*a*, 110*b* and the metallic elements 108, 109 engaged thereby. Stirrup 108 also is formed with a pair of downwardly bent tongs 116 (as viewed in FIGS. 6 and 8) which resiliently bear upon the exposed surface of microphone capsule 70 and make electric contact therewith; terminal tabs 114, 115 are respectively integral with central conductor 109 and stirrup 108 while a further tong 111 (FIG. 6) on ring 109 resiliently engages a center post of the capsule to complete the electrical connection diagrammatically illustrated in FIG. 5. The metallic pieces 108 and 109 may be stamped simultaneously from a single sheet, being initially left connected by a pair of tabs 112 which are subsequently removed after insulating bridge piece 110 has been attached to hold the parts in their concentric position.

The clip 84 illustrated in FIGS. 9–11 is generally similar to the clip 102 just described. It comprises a stirrup 124 with hooked extremities 134, elastically fitting into diametrically opposite slots 140 (FIG. 9) of an annular ridge 142, the latter being integral with base 26 and surrounding the capsule 182, and a centerpiece 125 separated from the stirrup by a gap 144 which during manufacture is left temporarily connected by a pair of integral tabs 128. In its finished form, the transducer support 84 also includes insulating connecting means bridging the gap 144, the connecting means being divided into two symmetrical plastic bodies 130′, 130″ each consisting of a pair of coextensive, generally trapezoidal elements 130_a_, 130_b_ and 130_c_, 130_d_ which are interconnected by rivets 131, passing through metal pieces 124 and 125 in the same manner as the divets 117 of clip 102. Centerpiece 125 has a pair of resilient tongs 132 bearing upon a terminal post at the center of the underlying receiver capsule 82; tabs 136, integral with stirrup 124, and 137, integral with centerpiece 125, rise upwardly through rectangular cutouts in the upper insulator layers 130_b_ and 130_d_, the duplication of these tabs allowing for the insertion of auxiliary equipment (such as overload protectors) in addition to the tying of the transducer 82 to its input leads. Conductive contact between stirrup 124 and the capsule of transducer 82 is established by a downward deformation 127 of each side arm of the stirrup along the transverse midplane of clip 84.

It will thus be seen that we have provided a telephone handset which, owing to the partial withdrawal of base plate 28 with mouthpiece 29 into the depression 34 for the dial 38, is of compact construction and has a low center of gravity when resting closed on a support as shown in FIG. 1, being thus quite stable in that position. Moreover, the instrument can be opened with one hand, upon the release of catch 156, by gripping the upper housing portion 20 and swinging it upwardly while the lower housing portion 22 remains substantially horizontal on surface 44 under its own weight and the aiding action of spring 60. Naturally, details of construction may be modified without departing from the spirit and scope of our invention as defined in the appended claims.

We claim:

1. A telephone handset comprising a housing with a first portion including a first base and a first cover removably overlying a rear face of said first base, a second portion including a second base and a second cover removably overlying a rear face of said second base, and hinge means interconnecting said portions for swinging movement between an open position and a closed position in which the front faces of said first and second bases lie next to each other, said first base being provided at its front face with a depression adjacent said hinge means and an elevation beyond said depression, said second base overlying said depression in said closed position; a telephone dial in said depression; an earpiece in said elevation; a mouthpiece in the front face of said second base; first electro acoustic transducer means behind said earpiece at the rear face of said first base; second electroacoustic transducer means behind said mouthpiece at the rear face of said second base; and circuit means connecting said transducer means and said dial to an outside line, said circuit means including contacts adjacent said hinge means on one of said bases and switch means on the other of said bases for closing said contacts in said open position.

2. A handset as defined in claim 1 wherein said switch means comprises an arm pivoted on the axis of said hinge means, said contacts including a spring armature engageable by an extremity of said arm and provided with a camming formation having an arcuate surface centered on said axis with a radium of curvature corresponding to the distance of said axis from said extremity.

3. A handset as defined in claim 1 wherein said circuit means includes conductor means having a first section secured to said first base, a second section secured to said second base, and an intermediate section extending transversely to said first and second sections along the axis of said hinge means over substantially the full width of said housing.

4. A handset as defined in claim 1 wherein said first cover is provided with fastening means for removably securing it to said first base, said second cover having an extension normally projecting beyond said hinge means for concealing said fastening means in the mounted condition of said second cover.

5. A handset as defined in claim 1 wherein said first and second bases are provided at their rear faces with annular ridges respectively surrounding said first and second transducer means.

6. A handset as defined in claim 5 wherein each of said transducer means is provided with a support forming part of said circuit means, said support including a metallic stirrup diametrically spanning the corresponding annular ridge and overlying the respective transducer means, a center piece spacedly disposed in a central bore of said stirrup, and an insulating connector joining said center piece to said stirrup, the transducer means having different conductive parts in contact with said stirrup and said center piece.

7. A handset as defined in claim 6 wherein said stirrup is provided with inbent extremities hooked into diametrically opposite recesses of said annular ridge.

8. A handset as defined in claim 6 wherein said insulating connector comprises a pair of coextensive elements sandwiching said center piece between them and extending across the gap separating said center piece from said stirrup.

9. A handset as defined in claim 1 wherein said circuit means includes an assembly of impedance elements including at least one inductor provided with a core, one of said bases being provided on its rear face with an upstanding U-shaped channel member, said core being a generally rectangular laminated structure frictionally receivable in said channel member.

10. A handset as defined in claim 1, further comprising spring means in the region of said hinge means anchored to said bases for urging said portions into said open position.

11. A handset as defined in claim 10, further comprising co-operating manually releasable latch means on said bases for holding said portions in said closed position.

12. A handset as defined in claim 1 wherein said second cover has an exposed underside provided with a resilient cushion remote from said hinge means.

References Cited

UNITED STATES PATENTS

| | | | |
|---|---|---|---|
| 1,298,771 | 4/1919 | Nash | 179—103 |
| 1,485,196 | 2/1924 | Murray | 179—103 |
| 2,490,637 | 12/1949 | Kraepelien | 179—103 |
| 2,508,654 | 5/1950 | Sears | 179—103 |
| 2,643,301 | 6/1953 | Cornfeld | 179—103 |

FOREIGN PATENTS 592,377 9/1947 England.

OTHER REFERENCES

Bell Laboratories Record, vol. 41, No. 7, July–August 1963, p. 273.

KATHLEEN H. CLAFFY, Primary Examiner

A. A. McGILL, Assistant Examiner

U.S. Cl. X.R.

179—100, 179